(12) United States Patent
Yoo

(10) Patent No.: US 7,503,739 B2
(45) Date of Patent: Mar. 17, 2009

(54) DRAW KEY ASSEMBLY FOR SECURING A KINGPIN

(76) Inventor: David B. Yoo, 169 Franklin St., Haworth, NJ (US) 07641

( * ) Notice: Subject to any disclaimer, the term of this patent is extended or adjusted under 35 U.S.C. 154(b) by 523 days.

(21) Appl. No.: 11/203,776

(22) Filed: Aug. 15, 2005

(65) Prior Publication Data
US 2007/0036631 A1    Feb. 15, 2007

(51) Int. Cl.
F16B 21/00    (2006.01)
(52) U.S. Cl. ............ 411/351; 403/295; 403/355
(58) Field of Classification Search .......... 411/351, 411/383, 384; 403/293, 294, 355
See application file for complete search history.

(56) References Cited

U.S. PATENT DOCUMENTS

| | | | |
|---|---|---|---|
| 564,171 A * | 7/1896 | Buckingham | 74/594.2 |
| 945,370 A * | 1/1910 | Braddock | 411/383 |
| 1,394,608 A * | 10/1921 | Davern | 411/390 |
| 1,464,901 A | 8/1923 | Conner | |
| 1,467,824 A | 9/1923 | Ahlers | |
| 1,934,883 A | 11/1933 | Reader | |
| 2,057,372 A | 10/1936 | Douglas et al. | |
| 2,208,189 A | 7/1940 | Jones | |
| 2,341,811 A | 2/1944 | Phelps | |
| 2,593,790 A * | 4/1952 | Pietzsch | 411/351 |
| 3,104,569 A | 9/1963 | Davis et al. | |
| 3,256,622 A * | 6/1966 | Hostetter | 37/458 |
| 3,492,906 A | 2/1970 | Hauser | |
| 3,841,771 A | 10/1974 | Shankwitz et al. | |
| 3,915,469 A | 10/1975 | Vanice | |
| 3,943,818 A | 3/1976 | Pryor et al. | |
| 4,428,211 A | 1/1984 | Hermann | |
| 4,480,513 A | 11/1984 | McCauley et al. | |
| 4,862,760 A * | 9/1989 | Kuwahara et al. | 74/473.3 |
| 4,889,458 A | 12/1989 | Taylor | |
| 5,170,551 A | 12/1992 | Norberg | |
| 5,350,183 A * | 9/1994 | Shealy | 280/93.512 |
| 5,709,399 A | 1/1998 | Smith, Jr. | |
| 5,722,784 A | 3/1998 | Link | |
| 5,865,067 A * | 2/1999 | Knapp | 74/512 |
| 6,196,781 B1 | 3/2001 | Yang | |

(Continued)

OTHER PUBLICATIONS

Written Opinion of International Searching Authority, mailed Jun. 3, 2008, issued in related International Patent Application No. PCT/US2006/032006.

(Continued)

*Primary Examiner*—Flemming Saether
(74) *Attorney, Agent, or Firm*—Greenberg Traurig, LLP

(57) ABSTRACT

Disclosed herein is a draw key assembly for securing a kingpin. In some embodiments of the invention, the draw key assembly includes a front portion, a rear portion, a rear end nut, and a front end nut. In a first preferred embodiment, the front portion includes a cylindrical body having a front end, a hex head attached to the front end, and a threaded member extending from the cylindrical body. In the first preferred embodiment, the rear portion includes a flared section with a threaded bore formed therein for mating with the threaded member. In the first preferred embodiment, the rear portion also includes a threaded fastener extending from the flared section. The rear end nut mates with the threaded fastener and the front end nut mates with threads formed about the front end of the cylindrical body. Additional embodiments of the invention are disclosed herein.

2 Claims, 5 Drawing Sheets

U.S. PATENT DOCUMENTS

| | | |
|---|---|---|
| 6,199,448 B1 | 3/2001 | Ruedisueli et al. |
| 6,406,239 B1 | 6/2002 | Mauri |
| 6,464,442 B1 | 10/2002 | Stingl |
| 6,579,026 B2 * | 6/2003 | Moses et al. ............... 403/158 |
| 6,585,467 B2 * | 7/2003 | Junkers ................... 411/204 |
| 6,811,364 B2 | 11/2004 | Kelzer |
| 2002/0159826 A1 | 10/2002 | Moses et al. |

OTHER PUBLICATIONS

International Search Report of International Searching Authority, mailed Jun. 3, 2008, issued in related International Patent Application No. PCT/US2006/032006.

* cited by examiner

DRAW KEY ASSEMBLY FOR SECURING A KINGPIN

FIELD OF THE INVENTION

The present invention relates to a draw key assembly for securing a kingpin. More specifically, the invention relates to a draw key assembly that may be easily installed and/or uninstalled to secure a kingpin.

BACKGROUND OF THE INVENTION

A kingpin secures an axel assembly of a vehicle to a front wheel assembly. The axel assembly and the front wheel assembly form a housing-like structure at the juncture thereof, which is referred to herein as a kingpin housing, and the kingpin is vertically aligned within the kingpin housing. The kingpin and the kingpin housing have a passage formed therebetween, which is referred to herein as a kingpin passage. A fastener passes through the kingpin passage to form a friction fit minimizing motion of the kingpin. The prior art includes U.S. Pat. No. 6,579,026, for example, which discloses a fastener for securing a kingpin.

It can be difficult to remove the prior art fastener from the kingpin passage. A mechanic may, for example, hammer, drill-out, or push the rear end of the fastener in an attempt to force the fastener through and out of the kingpin passage. This removal process is difficult, because there is an opposing force caused by the friction fit between the fastener, the kingpin, and the kingpin housing. Furthermore, the opposing force increases over time, due to the build-up of rust on the contact surfaces of the friction fit. What is needed in the art is a fastener that can be more easily removed from the kingpin passage.

SUMMARY OF THE INVENTION

Preferred embodiments of the invention overcome the disadvantages and shortcomings of the prior art by providing a draw key assembly having a front portion and a rear portion, with one of the two portions having a cylindrical body and the other of the two portions having a flared section.

For example, in a first preferred embodiment of the invention, the front portion includes the cylindrical body, a hex head, and a threaded member. The cylindrical body includes a front end and a mating rear end. The hex head is preferably attached to the front end of the cylindrical body, while the threaded member preferably extends from the mating rear end of the cylindrical body.

The rear portion, in the first preferred embodiment of the invention, includes a flared section having a mating front end, a rear end, a partially cylindrical side surface, and a substantially planar side surface. The mating front end of the flared section preferably includes a threaded bore formed therein for mating with the threaded member of the front portion. The rear portion preferably also includes a partially threaded fastener extending from the rear end thereof. The partially threaded fastener preferably includes a threaded side surface and an unthreaded side surface adjacent the substantially planar side surface of the flared section.

A mechanic may remove the first preferred embodiment of the draw key assembly from a kingpin passage by first removing the front portion and then removing the rear portion. In this respect, the mechanic may distributes the force required for removal across two instances of partial removal. This increases the ease at which the draw key assembly may be removed.

In accordance with a second preferred embodiment of the invention, the front portion has the bore formed therein and the rear portion includes the threaded member for mating therewith. For example, the mating rear end of the cylindrical body has the bore formed therein, while the threaded member extends from the mating front end of the flared section. A mechanic may, for example, remove the second preferred embodiment of the draw key assembly from a kingpin passage by first removing the front portion and then removing the rear portion.

In accordance with a third preferred embodiment of the invention, the draw key assembly includes a cylindrical body integrally formed with the flared section. The cylindrical body of the third preferred embodiment includes at least one cylindrical body section and at least one reduced-radius body section. In this regard, the surface-to-surface contact between the draw key assembly and the inner surface of the kingpin housing is reduced.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE INVENTION

Figure 1:
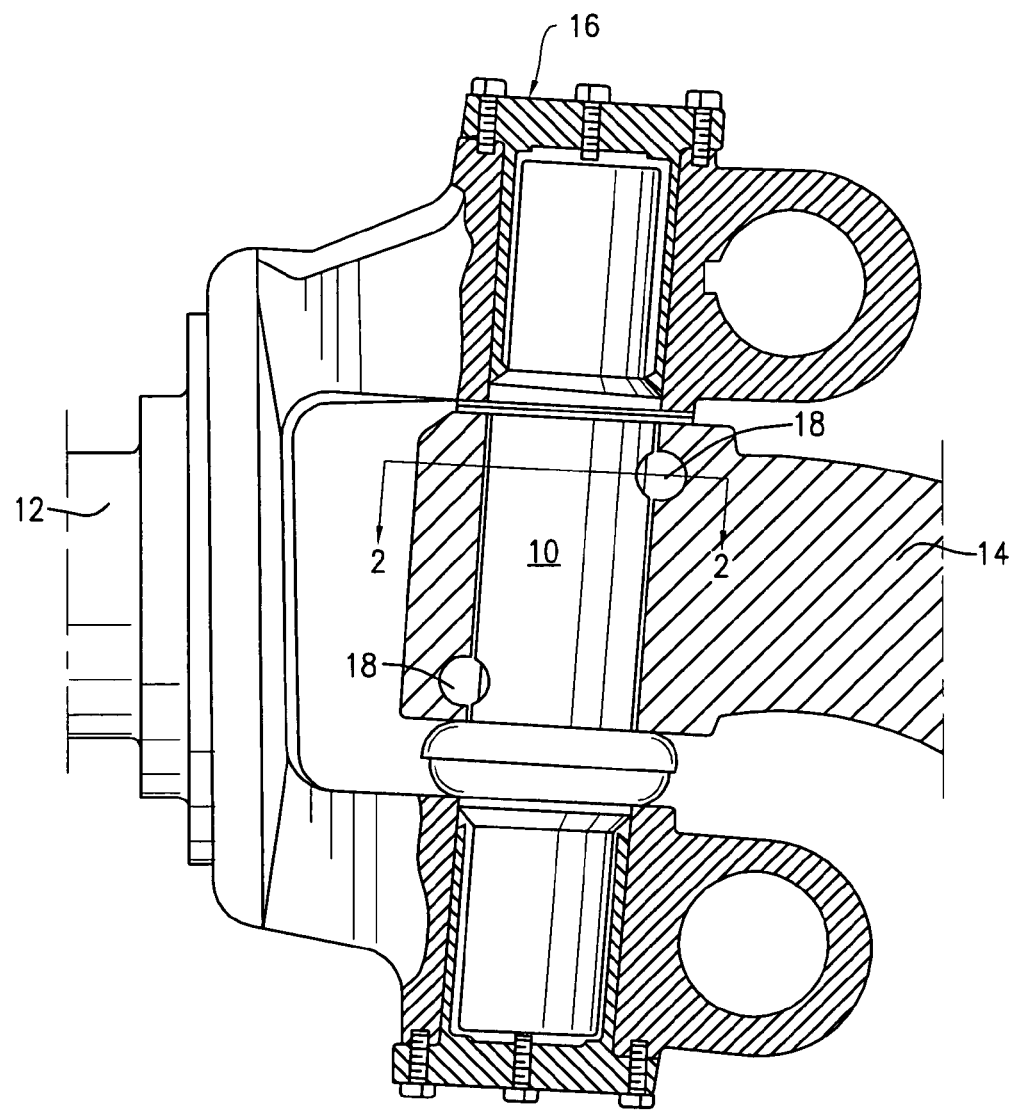
FIG. 1 is a partially-sectioned front view showing an axel assembly, a front wheel assembly, a kingpin housing formed at the juncture between the axel assembly and the front wheel assembly, a kingpin, and a plurality of kingpin passages.
Figure 2:
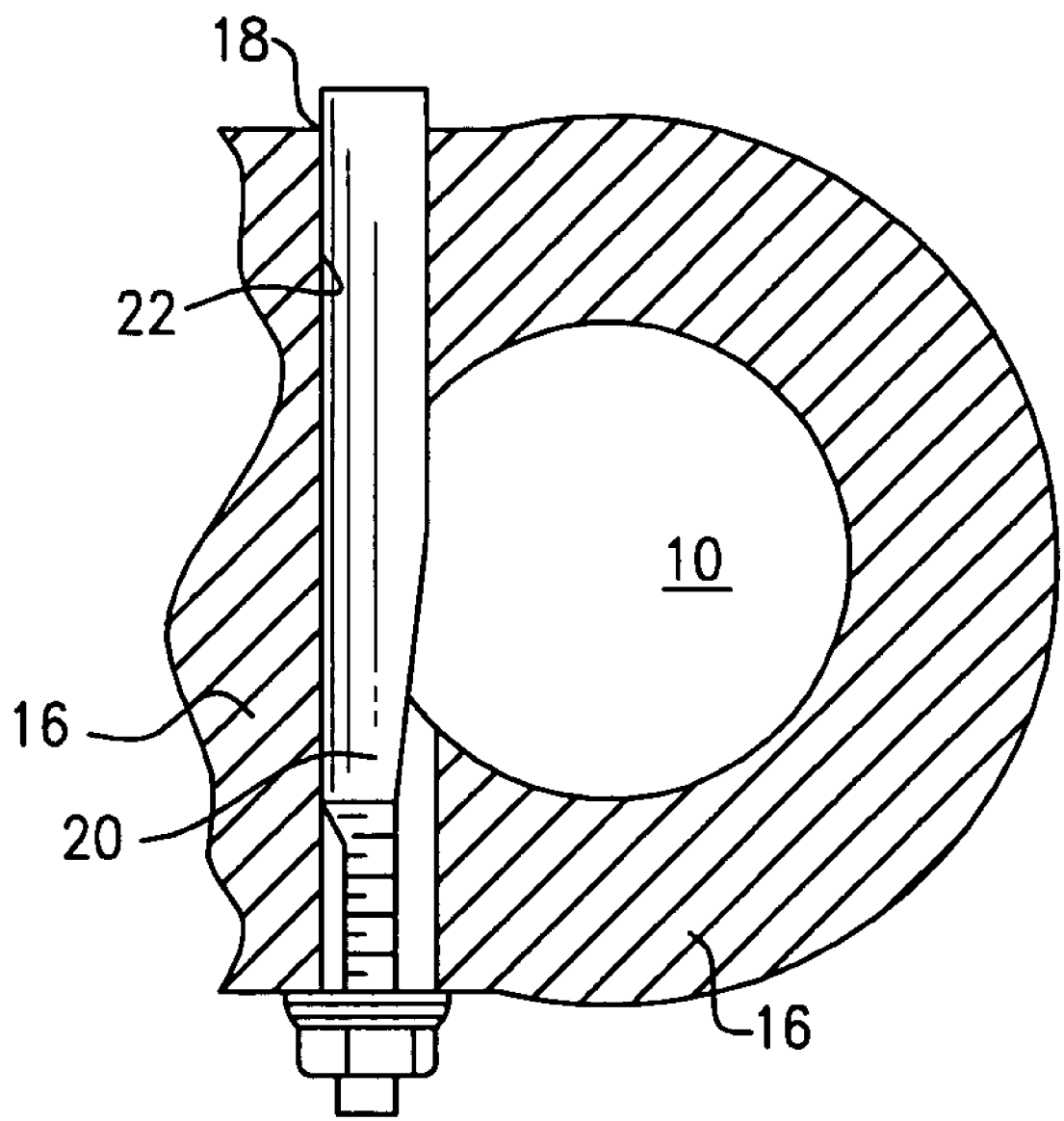
FIG. 2 is a cross-sectional view taken along section line 2-2 of FIG. 1 and rotated one-hundred and eighty-degrees, said cross-sectional view showing the kingpin passage and a prior art fastener inserted therein so as to secure the kinpin.

Referring to FIG. 1, a kingpin 10 secures an axel assembly 12 of a vehicle to a front wheel assembly 14. The axel assembly 12 and the front wheel assembly 14 form a housing-like structure at the juncture thereof, which is referenced herein as a kingpin housing 16, and the kingpin 10 is vertically aligned within the kingpin housing 16. The kingpin 10 and the kingpin housing 16 have passages formed therebetween, referenced herein as kingpin passages 18. FIG. 2 shows a prior art fastener 20 inserted in the kingpin passage 18 to create a friction fit with the kingpin 10 and/or an inside surface 22 of the kingpin housing 16 for securing the kingpin 10 to the kingpin housing 16.

Figure 4:
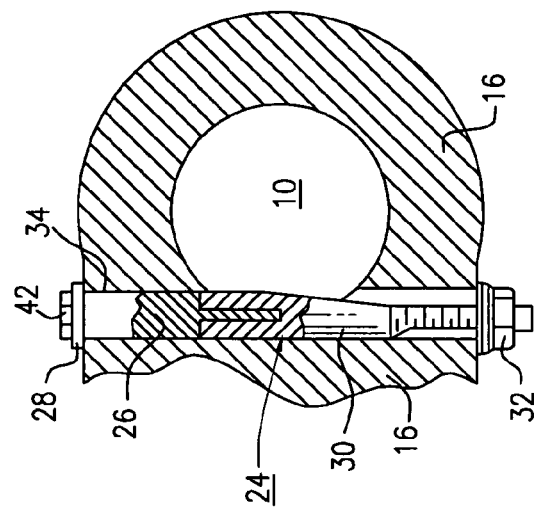
FIG. 4 is a cross-sectional view taken along section line 2-2 of FIG. 1 and rotated one-hundred and eighty-degrees, said cross-sectional view showing the kingpin passage and the draw key assembly of FIG. 3 positioned therethrough, the draw key assembly being partially broken to show engagement between its threaded member and threaded bore.
Figure 3:
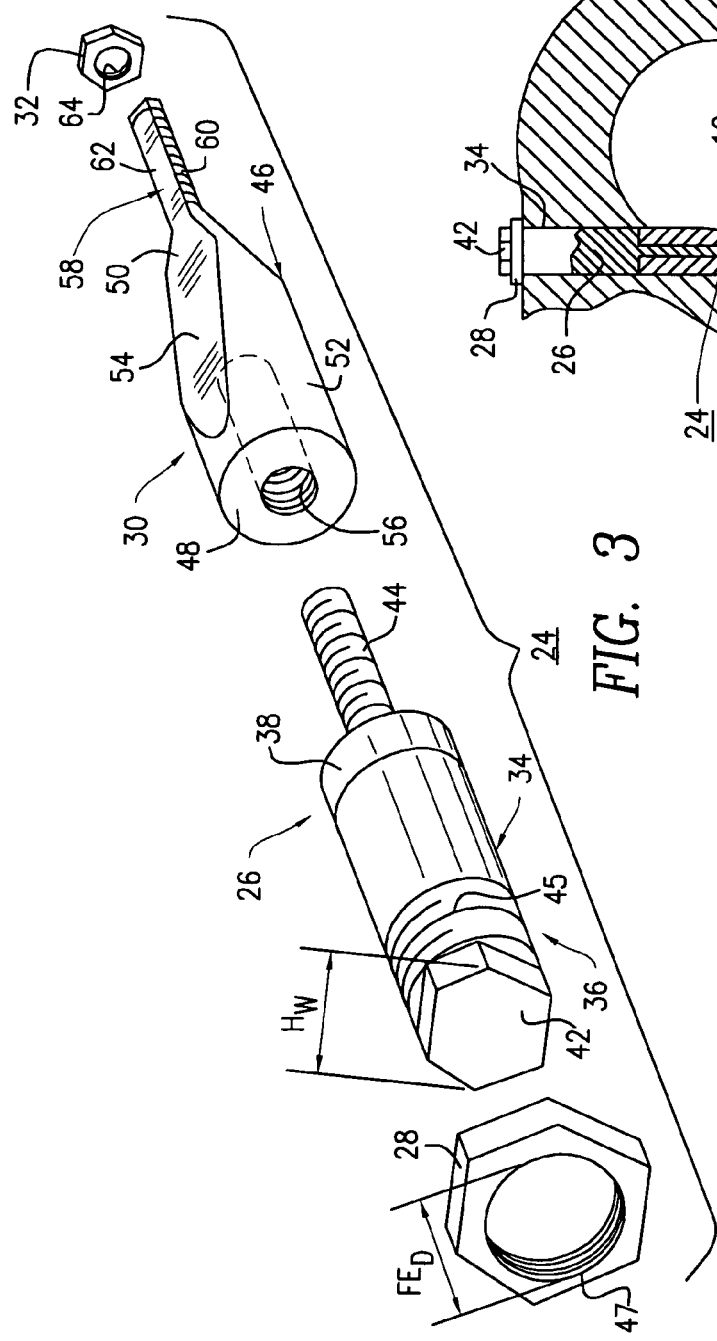
FIG. 3 is an exploded view of a draw key assembly constructed in accordance with a first preferred embodiment of the present invention.

FIGS. 3 and 4 show a draw key assembly 24 constructed in accordance with a first preferred embodiment of the present invention. The draw key assembly 24 includes a front portion 26, a front end nut 28, a rear portion 30, and a rear end nut 32, each of which will now be discussed in turn below. It should be understood that the relative terminology used herein, such as "front" and "rear," is solely for the purposes of clarity and designation and is not intended to limit the invention to embodiments having a particular position and/or orientation. Accordingly, such relative terminology should not be construed to limit the scope of the present invention.

Referring to FIGS. 3 and 4, the front portion 26 of the draw key assembly 24 includes a cylindrical body 34 having a front end 36 and a mating rear end 38. The front portion 26 preferably includes a threaded member 44 extending from the mating rear end 38 of the cylindrical body 34. The front end 36 of the front portion 26 preferably has threads 45 formed thereabout, which are referenced herein as front end threads. The front portion 26 also includes a head 42 attached at the front end 36. While a hex head is particularly suitable for use as the head 42, any type of head may be used. The maximum width of the head 42, referenced herein as the head width $H_w$, is preferably less than the diameter of the threads 45, which is referenced herein as the front end diameter $FE_D$.

With reference to FIG. 3, the front end nut 28 of the draw key assembly 24 has an inner surface diameter matching the front end diameter $FE_D$, which is preferably greater than the head width $H_w$ to allow a mechanic to pass the front end nut 28 over the head 42 and onto the threads 45 of the front end 36. The front end nut 28 has an inner threaded surface 47 for engagement with the front end threads 45 of the cylindrical body 34.

Referring back to FIGS. 3 and 4, the rear portion 30 of the draw key assembly 24 includes a flared section 46 having a mating front end 48, a rear end 50, a partially cylindrical side surface 52, and a substantially planar, angled side surface 54. The mating front end 48 of the rear portion 24 has a threaded bore 56 formed therein for receiving the threaded member 44 of the front portion 26.

As can be seen in FIGS. 3 and 4, the flared section 46 has an overall size and shape which are comparable to those of a corresponding section of a conventional kingpin-securing draw key, such as the prior art fastener 20 shown in FIG. 2. For instance, the side surface 54 is preferably tapered. Like the flared section 46, the threaded fastener 58 has a construction which is similar to that of a conventional kingpin-securing draw key, such as the prior art fastener 20 shown in FIG. 2. For instance, the threaded fastener 58 extends outwardly from the rear end 50 of the flared section 46. The threaded fastener 58 also includes a threaded side surface 60 and an unthreaded side surface 62. The threaded side surface 60 is partially cylindrical, while the unthreaded side surface 62 is substantially planar. The unthreaded side surface 62 is located adjacent the substantially planar side surface 54 of the flared section 46.

Still referring to FIGS. 3 and 4, the rear end nut 32 of the draw key assembly 24 has an inner threaded surface 64. More particularly, the inner surface 64 is sized and shaped to engage the partially threaded fastener 58 of the rear portion 30.

Some sample dimensions for the draw key assembly 24 will now be discussed; however, said dimensions are for the purposes of illustration only and should not therefore limit the scope of the present invention. The draw key assembly 24, when used for buses and trucks, can be about four and seven-tenths of an inch (4.7") in length from the front of the front end 36 to the rear of the partially-threaded fastener 58. The threaded member 44 can be about six-tenths of an inch (0.6") in length. The cylindrical body 34 can be about one and four-tenths of an inch (1.4") in length, while the flared section 52 can be about one and two-tenths of an inch (1.2") in length. As noted above, the draw key assembly 24 can have any suitable dimensions based on the requirements and/or needs of its application.

To install the draw key assembly 24, a mechanic attaches the front portion 26 to the rear portion 30 by inserting the threaded member 44 of the front portion 26 into the threaded bore 56 of the rear portion 30. The mechanic then inserts the assembled front portion 26 and rear portion 30 through the kingpin passage 18, with the fastener 58 being inserted first. When inserted, the head 42 preferably extends out from the kingpin passage 18. After insertion, the mechanic secures the draw key assembly 24 by fastening the rear end nut 32 to the fastener 58 of the rear portion 30. The front end nut 28 may optionally be fastened to the front end threads 45 of the front portion 26. However, it is not necessary to fasten the front end nut 28 to the front portion 26 to secure the front portion 26 and the rear portion 30 to the kingpin passage 18 for the proper functioning of the draw key assembly 24. The draw key assembly 24 preferably functions similarly to the prior art fastener 20 shown in FIG. 1, preventing the kingpin 10 from rotating about its longitudinal axis and/or moving linearly along said axis.

In preferred embodiments of the invention, the mechanic may then uninstall the draw key assembly 24 from the kingpin passage 18 in any one of the following manners. The mechanic may remove the draw key assembly 24 using a technique which is conventionally used for kingpin-securing draw keys, such as the prior art fastener 20, in accordance with methods of the prior art. For instance, the mechanic may attempt to remove the entire draw key assembly 24 in one instance by hammering, drilling-out, or pushing the partially threaded fastener 58 to force the draw key assembly 24 out from the kingpin passage 18. In order to do so, the mechanic first disengages the rear end nut 32 from the partially threaded fastener 58. However, due to the opposing force of friction, it may be difficult to force the draw key assembly 24 out of the kingpin passage 18, particularly if there has been a build-up of rust on the draw key assembly 24, the kingpin 10 and/or the inside surface 22 of the kingpin passage 18.

In accordance with a method of the present invention, the mechanic may remove the draw key assembly 24 sequentially, by first removing the front portion 26 and then removing the rear portion 30. The mechanic preferably first disengages the rear end nut 32 from the fastener 58 of the rear portion 30. If the front end nut 28 is fastened to the front portion 26, it is then removed. Next, the mechanic turns the head 42 with a wrench to disengage the front portion 26 from the rear portion 30 for removal of the front portion 26 from the kingpin passage 18. Because the front portion 26 includes a cylindrical body 34, turning the head 42 will cause the front portion 26 to rotate. Due to the flared section 46, the rear portion 30 is prevented from rotating when the front portion 26 is rotated, thereby allowing disengagement of the front portion 26 from the rear portion 30. After removing the front portion 26 from the kingpin passage 18, the mechanic may then hammer, drill-out, or push the rear portion 30 out from the kingpin passage 18. In this manner, the mechanic distributes the opposing force of the surface-to-surface friction over two instances of partial removal by separately and sequentially removing the front portion 26 and the rear portion 30 from the kingpin passage 18.

In accordance with an alternate method of the present invention, the mechanic may at least partially remove the front portion 26 by rotating the front end nut 28. The front end threads and the threaded member 44 are preferably oriented such that rotation of the front end nut 28 translates into linear motion of at least part of the front portion 26 out of the kingpin passage 18. The front end nut 28 bears against the kingpin housing 14 and the kingpin 10, thereby forcing at least part of the front portion 26 from the kingpin passage a distance corresponding to the dimensions of the front end threads 45.

Figure 6:
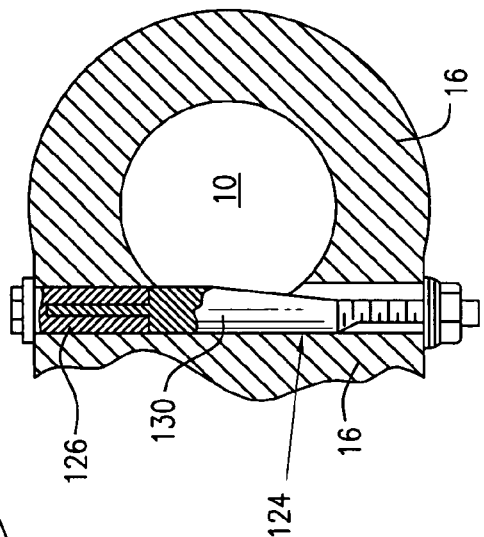
FIG. 6 is a cross-sectional view taken along section line 2-2 of FIG. 1 and rotated one-hundred and eighty degrees, said cross-sectional view showing the kingpin passage and the draw key assembly of FIG. 5 positioned therethrough, the draw key assembly being partially broken to show engagement between its threaded member and threaded bore.
Figure 5:
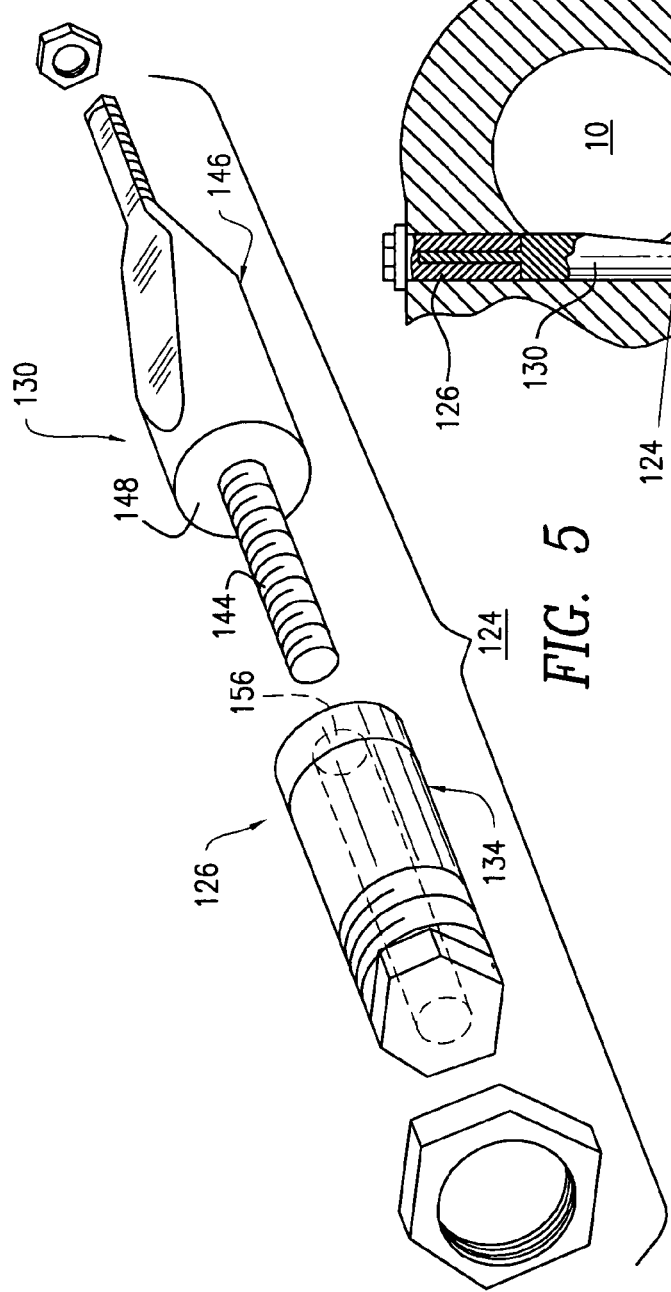
FIG. 5 is an exploded view of a draw key assembly constructed in accordance with a second preferred embodiment of the present invention.

FIGS. 5 and 6 show a second preferred embodiment of the present invention. Elements illustrated in FIGS. 5 and 6 which correspond substantially to the elements described above with reference to FIGS. 3 and 4 have been designated by corresponding reference numerals increased by one hundred. The embodiment of the present invention shown in FIGS. 5 and 6 is constructed and used in manners consistent with the foregoing description of the draw key assembly 24 shown in FIGS. 3 and 4, unless it is stated otherwise.

With reference to FIGS. 5 and 6, there is shown a draw key assembly 124 constructed in an identical manner to the draw key assembly 24 shown in FIGS. 3 and 4, except that the position of the threaded member 44 and the threaded bore 56 of the draw key assembly 24 are switched in the draw key assembly 124. More particularly, the front portion 126 includes a threaded bore 156, while the rear portion 130 includes a threaded member 144. In this regard, the front portion 126 includes a cylindrical body 134 having the threaded bore 156 formed therein, and the rear portion 130 includes a flared section 146 and a mating front end 148. A mechanic may install and uninstall the draw key assembly 124 in a manner analogous to the methods described above in connection with the draw key assembly 24 of FIGS. 3 and 4.

Figure 7:
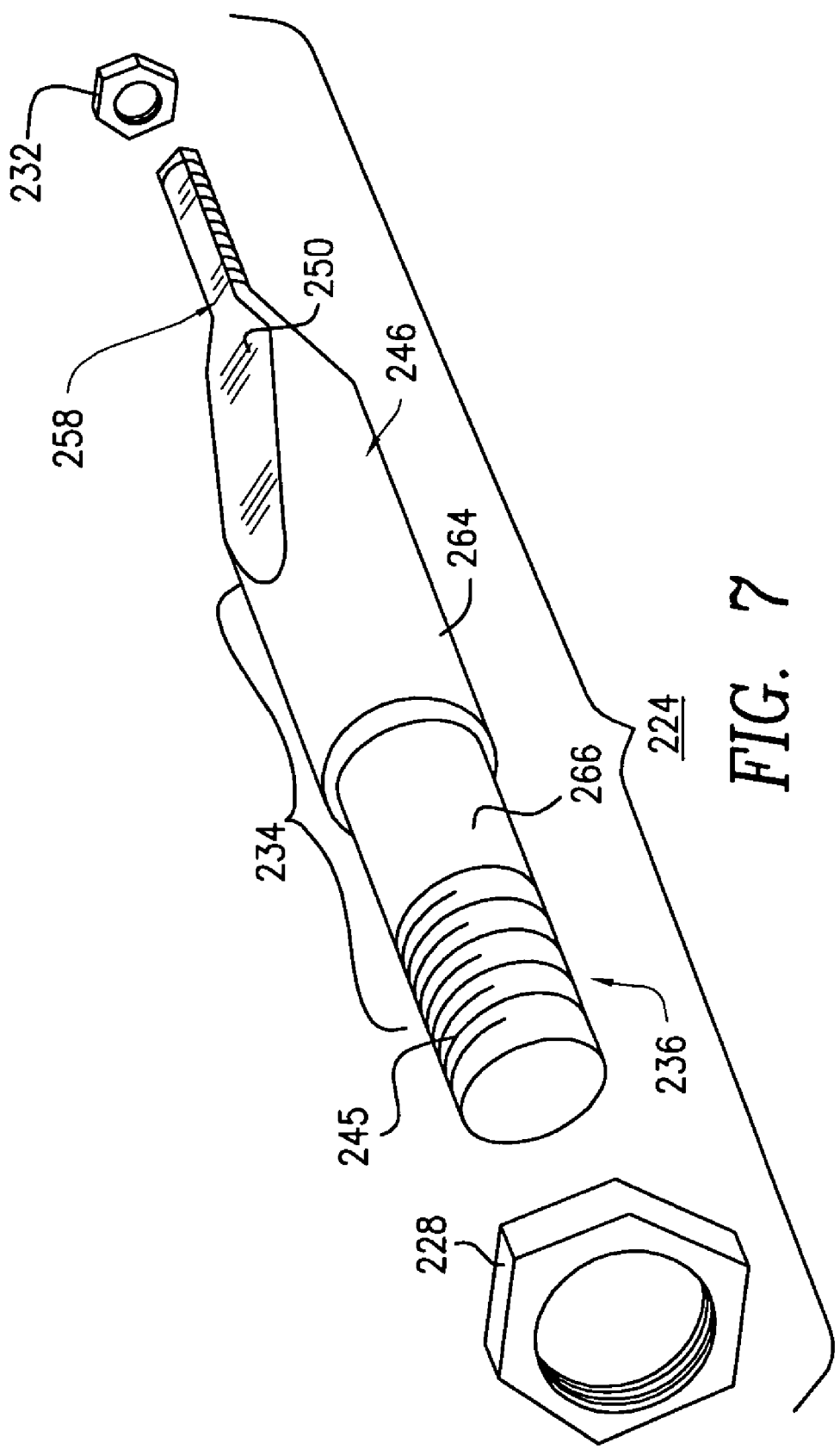
FIG. 7 is an exploded view of a draw key assembly constructed in accordance with a third preferred embodiment of the present invention.

FIG. 7 shows a third preferred embodiment of the present invention. Elements illustrated in FIG. 7 which correspond substantially to the elements described above with reference to FIGS. 3 and 4 have been designated by corresponding reference numerals increased by two hundred. The embodiment of the present invention shown in FIG. 7 is constructed and used in manners consistent with the foregoing description of the draw key assembly 24 shown in FIGS. 3 and 4, unless it is stated otherwise.

With reference to FIG. 7, there is shown a draw key assembly 224 constructed in accordance with the third preferred embodiment of the present invention. More particularly, the draw key assembly 224 includes a cylindrical body 234, a flared section 246, and a partially threaded fastener 258 that are each integrally (e.g., monolithically) formed with one another. As described below, the cylindrical body 234 includes multiple sections; however, in other respects, the draw key assembly 224 is similar to the draw key assemblies 24, 124 of FIGS. 3 and 4 and FIGS. 5 and 6, respectively. The draw key assembly 224 preferably does not include a head similar to the heads 42,142 shown in FIGS. 3-6.

The cylindrical body 234 preferably includes at least one cylindrical body section 264 and at least one reduced-radius body section 266. A flared section 246 extends from the cylindrical body 234 and has a rear end 250. A partially threaded fastener 258 extends from the rear end 250

The radius of the reduced-radius body section 266 is preferably smaller than the radius of the cylindrical body section 264. In this regard, the draw key assembly 224 can be installed in the kingpin passage 18, such that the surface of the reduced-radius body section 266 does not contact the inner wall surface defining the kingpin passage 18 (e.g., the kingpin 10 and the inside surface 22 of the kingpin housing 16). The draw key assembly 224 forms a firm friction fit with the kingpin 10. However, because the cylindrical body 234 includes the reduced-radius body section 266, the draw key assembly 224 may be more easily removed from the kingpin passage 18. In this regard, the amount of surface-to-surface contact between the draw key assembly 224 and the kingpin passage 18 is minimized, and there is less friction as a result thereof.

To install the draw key 224, a mechanic inserts the fastener 258 through and out of the kingpin passage 18. After insertion, the mechanic secures the draw key assembly 224 by fastening a rear end nut 232 to the fastener 258 and optionally fastening a front end nut 228 to front end threads 245 formed about a front end 236 of the cylindrical body 234 (e.g., the reduced-radius body section 266).

The draw key assembly 224 can be removed from the kingpin passage 18 in one of a plurality of ways. For instance, the mechanic may attempt to remove the draw key assembly 224 by hammering, drilling-out, or pushing the partially threaded fastener 258 to force the draw key assembly 224 out from the kingpin passage 18. Alternatively, the mechanic may remove the draw key assembly 224 by rotating the front end nut 228 in order to induce the cylindrical body 234 and the flared section monolithically formed therewith to move linearly out of the kingpin passage 18.

It will also be understood that the embodiments of the present invention described herein are merely exemplary and that a person skilled in the art may make many variations and modifications without departing from the spirit and the scope of the invention. All such variations and modifications, including those discussed above, are intended to be included within the scope of the invention as defined in the appended claims.

What is claimed is:

1. A draw key assembly for securing a kingpin, comprising: a cylindrical body including a mating rear end and a front end having front end threads formed thereabout; a head attached to said front end of said cylindrical body; a flared section having a mating front end, a rear end, a partially cylindrical side surface, and a substantially planar side surface; a partially threaded fastener extending from said rear end of said flared section and having a threaded side surface and an unthreaded side surface, said unthreaded side surface being substantially planar and adjacent said substantially planar side surface of said flared section; a threaded member extending from one of said mating rear end and said mating front end, another one of said mating rear end and said mating front end having a threaded bore formed therein for mating with said threaded member; a rear end nut for mating with the partially threaded fastener; and a front end nut sized to engage the front end threads.

2. The draw key assembly of claim 1, wherein said front end threads and said threaded member are oriented such that rotation of said front end nut translates into linear motion of said cylindrical body.

* * * * *